United States Patent Office 2,867,154
Patented Jan. 6, 1959

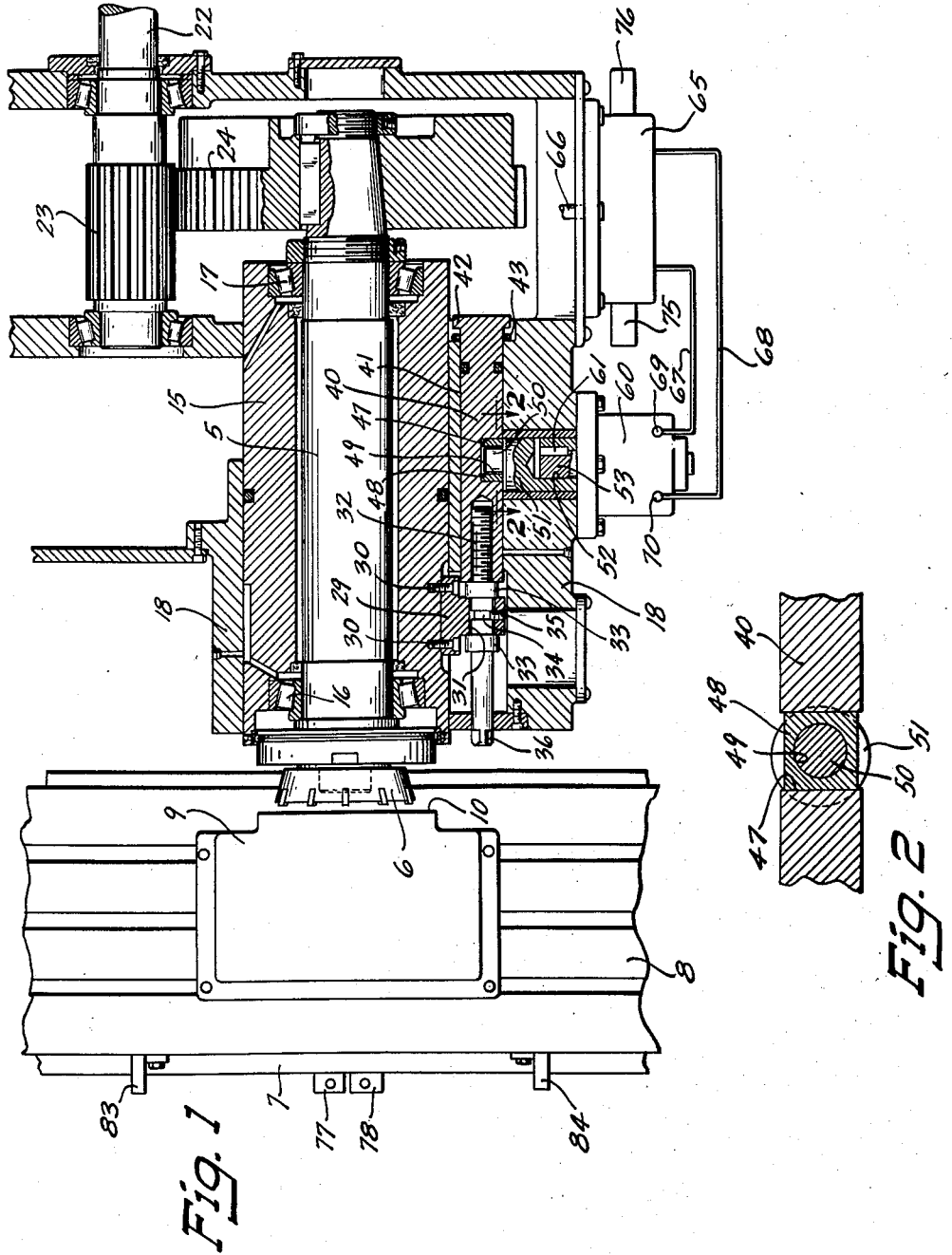

2,867,154

RETRACTING MECHANISM

Morris L. Hutchens, Brookfield, and Joseph J. Lenert and Frank J. Schalk, Milwaukee, Wis., assignors to Kearney & Trecker Corporation, West Allis, Wis., a corporation of Wisconsin Application September 23, 1955, Serial No. 536,260

4 Claims. (Cl. 90—16)

This invention relates generally to machine tools and more particularly to an improved retracting mechanism for separating the cutter and the workpiece during a return stroke after the machining operation has been completed.

In many types of machining operations it is convenient to return the workpiece or cutting tool to its starting position after the cut has been completed. In doing so, the finished surface of the workpiece is passed along the cutting edges of the tool during the return stroke, and since the tool is not functioning during the return stroke, the cutting forces which existed during the cutting operation are eliminated so that both the tool and the workpiece may be shifted slightly toward each other as the cutting forces tend to urge the tool and workpiece away from each other during the cutting operation. Therefore, if the tool and workpiece are not separated slightly before the return stroke is initiated, the cutting edges of the tool may contact the finished surface of the workpiece during the return stroke to scratch the surface. Such scratches are particularly objectionable when the return stroke is effected at a rapid traverse rate. In order to avoid marring the finished surface of the workpiece in this manner, it is the practice to cause a slight separation of the workpiece and the cutting tool before the return stroke is initiated so that the finished surface of the workpiece will not be contacted by the cutting edges of the tool.

It is therefore a general object of the present invention to provide an improved retracting mechanism for effecting a small movement of a movable member of a machine tool for the purpose of separating the workpiece from the tool during a return stroke after the completion of a cutting operation.

Another object of the present invention is to provide an improved retracting mechanism which may be actuated automatically after the completion of a cutting operation to effect a separating movement of a cutting tool relative to a workpiece and restore the members to their operating position upon the completion of the return stroke.

Another object is to provide an improved retracting mechanism capable of effecting a small movement of a movable member of a machine tool with great accuracy.

Another object is to provide an improved mechanism for retracting a movable member of a machine tool which incorporates separate means for manually adjusting the position of the movable member.

A further object is to provide an improved retracting mechanism that is sturdy but simple in construction and efficient in operation.

According to this invention the improved retracting mechanism of the present invention comprises a hydraulic vane type motor adapted to rotate its output shaft in either direction through a partial revolution. The output shaft of the hydraulic motor is connected to drive a pin which is eccentrically disposed relative to the output shaft so that rotation of the shaft produces an arcuate movement of the pin. The latter is journalled in a block that is slidably mounted in a slot formed in a slide member. As the pin is actuated in its arcuate movement, it causes a sliding movement of the block relative to the slide and an axial movement of the slide. The movable member that is to be retracted is attached to the slide to move with it so that when the hydraulic motor actuates the slide in one direction the movable member moves with it in a retracting movement, and when the slide is actuated in the opposite direction, the movable member moves with it to return to its operating position. The slide is connected to the movable member through a screw which is journalled in a bracket that is mounted on the movable member. The screw has threaded engagement with the slide and may be rotated to effect a manual adjustment of the movable member.

The foregoing and other objects of this invention, which will become more fully apparent from the following detailed description, may be achieved by the particular embodiment depicted in and described in connection with the accompanying drawings, in which:

Figure 1 is a view partly in plan and partly in horizontal section, illustrating a retracting mechanism embodying the features of the present invention and connected to effect a retracting movement of the cutter carrying spindle of a milling machine; and, Fig. 2 is an enlarged fragmentary detail view in vertical section taken along the plane represented by the line 2—2 in Figure 1 to illustrate the connection of the eccentric pin with the slide.

Reference is now made more particularly to the drawings showing the retracting mechanism of the present invention incorporated in a milling machine for the purpose of effecting small movements of a spindle 5 to withdraw its associated cutter 6 from the finished surface of a workpiece.

In the particular illustrated embodiment, the machine includes a base 7 upon which is slidably mounted a table 8 for supporting a workpiece, such as the workpiece 9 illustrated in the drawings. The table 8 is mounted for longitudinal movement for feeding a workpiece to the cutter 6 to perform a cutting operation. Thus, the workpiece 9 shown in the drawings moves with the table 8 in a feeding movement to cause the cutter 6 to produce a finished surface 10. After the cutting operation has been completed, the retracting mechanism functions to withdraw the cutter 6 a slight amount from the finished surface 10 to the position shown in Fig. 1 of the drawings so that the cutting edges of the cutter 6 will not contact the finished surface 10 during the return movement. After the cutter 6 has been withdrawn, the table 8 is actuated in the opposite direction to return the workpiece 9 to its starting position.

The spindle 5 is journalled in a quill 15, being supported within the bore of the quill by antifriction bearings 16 and 17. The quill 15 is slidably supported by a frame 18 for axial movement to cause a like axial movement of the spindle 5 and its associated cutter 6.

Power for rotating the cutter 6 is obtained from a suitable source (not shown) connected to rotate a shaft 22 and its associated elongated pinion 23 formed integrally with it. The pinion 23 has meshing engagement with a complementary gear 24 that is keyed to the rear extremity of the spindle 5. The gear 24 is secured to the spindle 5 to move with it, and as the spindle 5 is moved axially, the gear 24 will move with it relative to the pinion 23 but will retain engagement with the pinion 23 because of the length of the latter member. Axial movement of the spindle 5 therefore, will not disrupt the power train to drive the cutter 6. The power is transmitted from the source to rotate the shaft 22 and its associated pinion 23. Rotation of the pinion 23 causes the gear 24 to rotate to effect a like rotation of the spindle 5 and its associated cutter 6.

Axial movement of the spindle 5 may be effected by the retracting mechanism of the present invention which comprises a bracket 29 secured to the quill 15 at its periphery by two cap screws 30. The bracket 29 extends outwardly of the quill 15 and presents a bore 31 for receiving a screw 32 which is journalled therein for rotation relative to the bracket 29. Axial movement of the screw 32 relative to the bracket 29 is prevented by a pair of collars 33 fixed to the screw on either side of the bracket 29. A portion of the screw 32 between the collars 33 is reduced in diameter to form a groove 34 for receiving the end of a set screw 35 which is threaded through the bracket 29 to enter the bore 31 so that it may be tightened against the bottom surface of the groove 34 for the purpose of locking the screw 32 to the bracket 29 to prevent its rotation. When the set screw 35 is withdrawn from its locking position, the screw 32 may be conveniently rotated by applying a wrench to a squared end 36 formed on the end of the screw that extends to the exterior of the frame 18.

The opposite end of the screw 32 is in threaded engagement with an axial threaded bore formed in one end of a slide 40 which is located in a bore 41 formed in the frame 18 to slidably support the slide 40 for axial movement. The opposite end of the slide 40 is provided with a flange 42 disposed to cooperate with a washer 43 to establish the limit of leftward movement of the slide 40 as viewed in Fig. 1. The washer 43 is fixed to the frame 18 at the end of the bore 41 to encircle the slide 40 so that when the latter is moved in a leftward direction as viewed in Fig. 1, the flange 42 will abut the washer 43 to precisely establish the limit of movement.

As best seen in Fig. 2, a vertical slot 47 is formed in the central portion of the slide 40 for the purpose of receiving a slide block 48 which is arranged to slide within the slot 47. The slide block 48 includes a central bore 49 for receiving an eccentric pin 50 that is eccentrically secured to the end of a stub shaft 51. The opposite end of the stub shaft 51 has a concentric axial bore 52 formed therein for receiving a drive shaft 53 of a hydraulic motor 60 that furnishes power for actuating the spindle 5 in its axial movement. Suitable keyways are provided in the drive shaft 53 and the bore 52 for receiving a key 61 to secure the drive shaft 53 to the stub shaft 51 so that they will rotate together.

The motor 60 in the illustrated embodiment is a vane type hydraulic motor as a preferred arrangement although other types of motors may be employed for furnishing power to effect the retracting movement. It is incapable of continuous rotation, being arranged to revolve its output shaft 53 in either direction less than 360° with a 180° movement producing maximum movement of the spindle 5 and its associated cutter 6. Operation of the motor 60 produces rotation of its drive shaft 53 and its cooperating stub shaft 51 through a portion of a revolution. Since the pin 50 is mounted eccentrically on the end of the stub shaft 51, a rotational movement of the latter will function to move the eccentric pin 50 in an arcuate path. To accommodate such arcuate movement, the slide block 48 will be moved in a vertical direction, and the slide 40 will move in a horizontal direction. Such movement of the slide 40 will cause a like movement of the quill 15 and its associated spindle 5 and cutter 6 by reason of its connection with the quill 15 through the screw 32 and bracket 29.

It is apparent that rotation of the motor 60 in one direction will serve to move the cutter 6 in a direction to retract it from its operating position, and opposite rotation of the motor 60 will serve to move the cutter 6 to its operating position for performing a cutting operation. The exact location of the cutter 6 when in its retracted position is not important, it only being necessary that the cutting edges of the cutter be withdrawn from the finished surface 10 of the workpiece 9 so that the finished surface will not be marred by contact with the cutting edges of the cutter during the return movement. For this reason, the limit of the retracting movement is established by the limit of rotation of the hydraulic motor 60 when functioning to withdraw the cutter 6 from the workpiece. On the other hand, the location of the cutter 6 when in its operating position is of the utmost importance, and it must be moved to this position with extreme accuracy. For this reason, the operating position of the cutter 6 is established by the abutment of the flange 42 with the washer 43, with the motor 60 functioning to move the slide 40 to the left as viewed in Fig. 1, until the flange 42 is moved into tight engagement with the washer 43.

The desired operating position of the cutter 6 relative to the workpiece 9 is set by manipulating the screw 32 through its squared end 36. When setting up the machine to perform the desired operation, the motor 60 is actuated to move the slide 40 to the left as viewed in Fig. 1 to bring the flange 42 into abutment with the washer 43. The desired cutting position of the cutter 6 relative to the workpiece 9 is then accurately established by rotating the screw 32 to effect an axial movement of the quill 15 and thereby move the cutter 6 toward or away from the workpiece 9 as may be desired. Such movement will be produced because rotation of the screw 32 will produce its axial movement relative to the slide 40, and since the slide 40 is prevented from movement except when actuated by the motor 60 because of its connection therewith through the eccentric pin 50, the quill 15 will move with the screw 32 by reason of its connection therewith through the bracket 29. Movement of the quill 15 produces a like movement of the spindle 5 and the cutter 6 to adjust the axial position of the cutter 6 relative to the workpiece 9. When the retracting mechanism is subsequently operated, the cutter 6 will always be accurately located in the thus established cutting position by reason of the abutment of the flange 42 with the washer 43.

The operation of the hydraulic motor 60 may be controlled in a variety of ways, as for example, by a hydraulic valve 65 that is actuated in response to the position of the table 8. Hydraulic pressure is supplied to the valve 65 through a conduit 66 from a suitable source and is transmitted to the motor 60 through a conduit 67 or a conduit 68 depending upon the position of the plunger (not shown) of the valve 65. The conduit 67 is connected to the motor 60 through a port 69 to supply pressure for actuating the motor in one direction. Pressure for actuating the motor in the opposite direction is obtained from the conduit 68 which is in communication with a port 70 of the motor 60.

The valve 65 is actuated by a pair of solenoids 75 and 76 connected to be energized from a suitable source of electrical energy under the control of a pair of switches 77 and 78. The switches 77 and 78 are mounted on the base 7 of the machine in position to be actuated by a pair of movable dogs 83 and 84 that are adjustably carried on the front edge of the table 8 in well known manner so that they may be positioned at a desired location along the length of the table 8.

Assuming that the table 8 is travelling in a horizontal direction that appears as a downward direction as viewed in the drawings, during its feeding movement, to feed the workpiece 9 to the cutter 6, the dog 83 will actuate the switch 77 after the cutting operation is completed and the finished surface 10 will have passed the rotating cutter 6. Actuation of the switch 77 serves to complete a circuit for energizing the solenoid 75. The energized solenoid 75 operates to move the plunger (not shown) in the valve 65 in a direction to place the conduit 67 in communication with the conduit 66 for the purpose of directing the hydraulic pressure to the motor 60 through the port 69. Hydraulic pressure applied in this manner to the motor 60 causes it to be actuated in a direction to move the slide 40 to the right as viewed in Fig. 1, to the position shown in Fig. 1, to retract the cutter 6 from its operating position for the purpose of withdrawing its cutting edges from the finished surface 10 during the return movement. The table 8 is then moved horizontally in the opposite direction or upwardly as viewed in the drawings, in its return movement, and since the cutter 6 has been retracted, there is no danger of its cutting edges contacting the finished surface 10.

After the finished surface 10 has passed the cutter 6 in its return movement, the dog 84 will contact the switch 78 to actuate it and thereby complete a circuit for energizing the solenoid 76. The energized solenoid 76 then functions to shift the plunger in the valve 65 in a direction to place the conduit 68 in communication with the pressure conduit 66 for directing hydraulic pressure to the port 70 of the motor 60. The application of hydraulic pressure to the motor 60 in this manner functions to actuate it in the opposite direction to revolve the eccentric 50 in a direction for moving the slide 40 to the left as viewed in Fig. 1, until its flange 42 abuts the washer 43. Such movement of the slide 40 serves to move the spindle 5 and its associated cutter 6 a like amount to accurately position the cutter in its operating position for the purpose of effecting a cutting operation along the precise path that the previous cutting operations were completed. The hydraulic pressure is maintained in the motor 60 through the port 70 to retain the flange 42 of the slide 40 in tight engagement with the washer 43. The quill 15 and its associated spindle 5 and cutter 6 will therefore be retained in the accurate operating position until the valve 65 is again actuated to reverse the flow of hydraulic pressure to the motor 60 for producing the retracting movement.

From the foregoing detailed description of an explanation of the operation of the exemplifying retracting mechanism herein set forth as a practical embodiment of the present invention, it will be apparent that there has been provided an improved retracting mechanism for withdrawing a cutter from its operating position during a return movement of the work-piece relative to the cutter, which is capable of accurately restoring the cutter to its operating position upon completion of the return movement, and of maintaining the cutter in its operating position during the succeeding cutting operation.

Although the illustrative embodiment of the invention has been described in considerable detail for the purpose of disclosing a practical operative structure whereby the invention may be practiced advantageously, it is to be understood that the particular apparatus described is intended to be illustrative only, and that various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a retracting mechanism for moving a movable member of a machine tool to effect a separating movement between a workpiece and a cutting tool so that the cutter will not contact the finished surface of the workpiece during the return stroke; a frame; a rotary hydraulic motor mounted on said frame and having a drive shaft, said motor being arranged to rotate its drive shaft through a portion of a revolution in either direction; an eccentric pin connected to be driven by said drive shaft about an axis offset from but parallel to its own axis so that it is driven in an arcuate path; a slide slidably supported by said frame and having a slot for receiving said eccentric pin for sliding movement in a direction transverse to the direction of movement of the slide so that the slide will be moved in its path of travel when the eccentric pin is actuated to accommodate the arcuate movement of the pin; means connecting said slide to said movable member so that movement of the slide will effect a similar movement of the movable member; and an abutment mounted on said frame in position to be abutted by said slide to limit its movement in the direction in which it moves the movable member into cutting position; whereby the retracting movement of the movable member is effected by the arcuate movement of said eccentric pin and the cutting position of the movable member is accurately established by said abutment, while the retracted position of the movable member is determined by the limit of movement of the hydraulic motor.

2. In a retracting mechanism for moving a movable member of a machine tool to effect a separating movement between a workpiece and a cutting tool so that the cutter will not contact the finished surface of the workpiece during the return stroke; a frame; a motor mounted on said frame and arranged for limited operation in both directions; an eccentric pin connected to be rotated by said motor about an axis offset from but parallel to its own axis so that it is driven in an arcuate path of less than 360°; a slide slidably supported by said frame and having a slot for receiving said eccentric pin for sliding movement in a direction transverse to the direction of movement of the slide so that the slide will be moved in its path of travel when the eccentric pin is actuated to accommodate the arcuate movement of the pin, said slide also having a threaded axial bore at one end; a bracket secured to said movable member; a screw journalled in said bracket but restrained from axial movement relative to the bracket and in engagement with the threaded hole in said slide to connect the movable member for movement with the slide; and an abutment mounted on said frame in position to be abutted by said slide to limit its movement in the direction in which it moves the movable member into cutting position; whereby the movable member may be moved by the operation of said motor or independently of the motor and relative to the slide by the rotation of the screw.

3. In a retracting mechanism for moving a movable member of a machine tool to effect a separating movement between a workpiece and a cutting tool so that the cutter will not contact the finished surface of the workpiece during the return stroke; a frame; a hydraulic motor mounted on said frame and arranged to operate in both directions; an eccentric pin connected to be rotated by said hydraulic motor about an axis offset from but parallel to its own axis so that it is driven in an arcuate path of less than 360°; a slide slidably supported by said frame and connected to be actuated linearly in its path of movement by the arcuate movement of the eccentric pin said slide having a threaded axial bore at one end; a bracket secured to said movable member; and a screw journalled in said bracket but restrained from axial movement relative to the bracket and in engagement with the threaded hole in said slide to connect the movable member for movement with the slide; whereby the movable member may be moved by the operation of said hydraulic motor or independently of the hydraulic motor and relative to the slide by the rotation of the screw.

4. In a retracting mechanism for moving a movable member of a machine tool to effect a separating movement between a workpiece and a cutting tool so that the cutter will not contact the finished surface of the workpiece during a return stroke; a frame; a source of power; a slide slidably supported by said frame and connected to be actuated in its path of movement by said source of power a limited distance in either direction; a bracket secured to said movable member; a screw journalled in said bracket but restrained from axial movement relative to the bracket and in threaded engagement with the slide to connect the movable member for movement with the slide while rendering the movable member movable relative to the slide by rotation of the screw; and an abutment mounted on said frame in position to be abutted by said slide to limit its movement in the direction in which it moves the movable member into cutting position;

whereby the cutting position of the movable member is accurately established by said abutment and the retracted position of the movable member is determined by the limit of operation of the source of power.

References Cited in the file of this patent

UNITED STATES PATENTS

| | | |
|---|---|---|
| 796,171 | Ambrose | Aug. 1, 1905 |
| 1,866,259 | Kearney | July 5, 1932 |
| 2,163,443 | Abrams | June 20, 1939 |
| 2,396,631 | Anderson | Mar. 19, 1946 |
| 2,435,046 | Martin | Jan. 27, 1948 |
| 2,445,433 | Holmstrom | July 20, 1948 |
| 2,543,661 | Edlich et al. | Feb. 27, 1951 |
| 2,596,343 | Miller | May 13, 1952 |
| 2,682,204 | Carlsen et al. | June 29, 1954 |
| 2,712,767 | Silber | July 12, 1955 |